United States Patent [19]
LaBonte

[11] Patent Number: 4,767,687
[45] Date of Patent: Aug. 30, 1988

[54] BATTERY SEPARATOR
[75] Inventor: Robert J. LaBonte, Rochester, N.H.
[73] Assignee: Lydall, Inc., Manchester, Conn.
[21] Appl. No.: 136,334
[22] Filed: Dec. 22, 1987
[51] Int. Cl.⁴ ............................................. H01M 2/16
[52] U.S. Cl. .................................... 429/206; 429/249; 429/255
[58] Field of Search ............... 429/249, 247, 206, 255; 162/141, 142, 157.1, 157.2

[56] References Cited

U.S. PATENT DOCUMENTS

| | | | |
|---|---|---|---|
| 2,956,100 | 10/1960 | Mendelsohn et al. | 429/249 X |
| 2,994,728 | 8/1961 | Herold | 429/249 X |
| 3,787,240 | 1/1974 | Gillman et al. | 429/249 X |
| 4,245,013 | 1/1981 | Clegg et al. | 429/144 |
| 4,327,157 | 4/1982 | Himy et al. | 429/248 X |

Primary Examiner—Anthony Skapars
Attorney, Agent, or Firm—Murray and Whisenhunt

[57] ABSTRACT

In an alkaline dry cell battery separator being a laid mat of non-dissolvable polyvinyl alcohol fibers held together by a matrix of dissolved or partially dissolved dissolvable polyvinyl alcohol fibers, the improvement comprising the mat having up to 85% of cellulosic fibers relatively uniformly distributed in and among the non-dissolvable polyvinyl alcohol fibers and held therein by said matrix.

19 Claims, 1 Drawing Sheet

BATTERY SEPARATOR

The invention relates to battery separators, and more particularly to separators for use in alkaline cell batteries. Even more particularly, it relates to such separators which are made of polyvinyl alcohol fibers.

BACKGROUND OF THE INVENTION

Battery separators are distinguished in the art as primary battery separators and secondary battery separators. A secondary battery separator, such as a separator for a conventional lead/acid battery, requires very different properties as opposed to a separator for a primary battery, e.g., an alkaline cell battery. Secondary batteries, normally, are rechargeable many times, while primary batteries, if rechargeable at all, are rechargeable to a very limited degree. As a result, the materials required for a secondary battery separator are substantially different from the materials required for a primary battery separator.

A number of materials have been used in the prior art in connection with secondary batteries, but the acceptability of those materials for primary batteries cannot be predicted from acceptability in a secondary battery, and, most often, separators useful in a secondary battery are not useful in a primary battery. While a wide range of separators have been successfully used in secondary batteries, e.g., plastics, wood, wood pulp, rubber, and the like, materials which have been found acceptable for primary batteries are far more limited. This is particularly true in regard to alkaline primary batteries, such as a conventional alkaline cell battery, since the mode of manufacture thereof is considerably different from the mode of manufacture of a conventional secondary battery, e.g., a lead/acid automobile battery, and an alkaline cell primary battery separator must be capable of operating in a highly alkaline medium, as opposed to a low pH acid medium.

Thus, acceptable separators for primary batteries, and especially alkaline cell batteries, have been substantially limited in the art. However, the preferred alkaline cell battery separator is made of polyvinyl alcohol fibers. These fibers are, essentially, unique in this art, in that they can be formed into a flexible mat of thin cross-sections to allow usual manufacture of the cells, but at the same times these fibers are stable, particularly dimensionally stable, at the high alkaline pHs of an alkaline cell battery. Accordingly, most modern alkaline cell batteries use battery separators made of polyvinyl alcohol fibers.

In order to form a mat of the polyvinyl alcohol fibers, dissolvable or partially dissolvable polyvinyl alcohol fibers are mixed with non-dissolvable polyvinyl alcohol fibers in a convenient solvent, usually water. After sufficient dissolution of the dissolvable polyvinyl alcohol fibers, the mixture is then formed into a shape-sustaining form, e.g., a mat, and dried. The dissolved polyvinyl alcohol forms a matrix about the non-dissolvable polyvinyl alcohol fibers and thus keeps that mat in a shape-sustaining form. In addition, that matrix forms a permeable barrier between the polyvinyl alcohol fibers for appropriate ionic transfer during discharge of the alkaline cell battery.

While such battery separators are the preferred form in the art, they do suffer from several disadvantages. Firstly, due to variables in manufacture, especially the above-noted dissolving step, the strength of the battery separator itself may vary considerably. The matrix formed by the dissolved polyvinyl alcohol is not a particularly strong matrix, and the polyvinyl alcohol fibers, themselves, are not particularly strong fibers in the wet state. Thus, in the manufacture of the battery separators, differences in the non-dissolved fibers and in the dissolved matrix can result in a formed mat that is subject to tearing. Further, the polyvinyl alcohol matrix, while providing a permeable matrix, tends to produce considerable variation of permeability, which results in uneven ionic transport across the battery separator, and somewhat variable electrical discharge thereof. Also, the process of manufacturing both the non-dissolvable polyvinyl alcohol fibers and the dissolvable polyvinyl alcohol fibers inherently produces variabilities in these fibers. This results in variability in the matrix formed by the dissolved fibers and in the permeability property, of the non-dissolvable fibers/matrix forming the battery separator.

However, probably of more importance than any of the foregoing disadvantages of these conventional alkaline cell battery separators is the penetration of those conventional battery separators by dendrite formation. As is well known, in such alkaline cell batteries, the metallic component of the battery, e.g., lead or zinc, is separated from the other battery components by the battery separator. That battery separator, during manufacture of the battery, is wetted with a highly alkaline solution in order to provide an ionic transport between the two components of the battery. During use of the battery, and even during non-use and during storage, dendritic structures form from the metal component of the battery. If these dendritic structures continue to form and enlarge, they can pierce through the battery separator and contact the other component of the battery, thus, providing a direct short of the battery, and, of course, resulting in a decreased life or unserviceability of the battery. While the polyvinyl alcohol battery separators are resistant to the highly alkaline solution wetted therewith, these conventional separators are relatively easily pierced by such dendritic structures, and the variability in porosity of the separators allows more easy formation of the dendritic structures through the battery separator, causing such shorts in the battery.

In view of the foregoing, the art has long sought methods of improving the relatively unique polyvinyl alcohol battery separator. However, for the reasons explained above, this effort in the art has been difficult and unsuccessful, primarily because of the demanding properties of alkaline cell battery separators. It would, therefore, be of substantial advantage to the art to provide improved polyvinyl alcohol alkaline cell battery separators, which mitigate the disadvantages noted above.

BRIEF DESCRIPTION OF THE INVENTION

The invention is based on several primary discoveries and several subsidiary discoveries. As a first primary discovery, it was found that the variabilities in permeability, of the polyvinyl alcohol separator could be substantially improved if the separator contained an appreciable portion of other fibers which have less variability, on and as a manufactured basis, than the variability of the polyvinyl alcohol fibers. This, accordingly, produces a more homogeneous separator and one with substantially more predictability of its properties, and especially permeability.

As a subsidiary discovery in this regard, it was found that up to about 85% of such other fibers could be added to the polyvinyl alcohol battery separator and still retain the essential properties of the polyvinyl alcohol separator, when the other fibers are of very special characteristics. With such large amounts of other fibers added to the separator, substantial increases in the predictability of properties, noted above, and a substantial mitigation of the disadvantages of the polyvinyl separator could be achieved. As a further subsidiary discovery, it was found that with as little as 5% of such other fibers, substantial improvement in the separator could be achieved.

As a second primary discovery, it was found that the other fibers, in order to be effective in the battery separator for the reasons noted above and to be useful in improving the battery separator, must be a cellulosic fiber, as opposed to the many other fibers available to the art. As a subsidiary discovery in this regard, it was found that the cellulosic fibers should be either a natural cellulosic fiber, or a wood or plant pulp cellulosic fiber, and especially such fibers of certain characteristics.

As a third primary discovery, it was found that the dissolved polyvinyl alcohol well adheres to the cellulosic fibers and incorporates those fibers into the separator in a permanent manner. It was also found that the cellulosic fibers very substantially improved the predictability of permeability in the separators when used in higher amounts. As a subsidiary discovery in this regard, it was found that the cellulosic fibers could be placed into the battery separator simply by addition to the conventional process for producing polyvinyl alcohol battery separators. This is a very substantial advantage to the present invention.

However, as important as the above discoveries are, a further very unexpected and surprising discovery was made, which is the basis of a major feature of the present invention. In this regard, in testing the improved battery separators of the nature described above, it was quite unexpectedly discovered that these improved battery separators very substantially decreased the dendritic formation in the batteries made with the separator. While the explanation of the very unexpected and surprising property is set forth more fully below, briefly, much more uniform permeability (porosity) of the present separator, with attendantly much smaller pore size, interferes with growth of dendrites and therefore largely avoids sufficient formation of the dendrites that the dendrites can pierce the battery separator and cause a shorting of the battery.

Thus, briefly stated, the present invention provides an alkaline cell battery separator which is a laid mat of non-dissolvable polyvinyl alcohol fibers held together by a matrix of dissolved, or partially dissolved, dissolvable polyvinyl alcohol fibers, and wherein the improvement comprises the mat having up to 85% of cellulosic fibers relatively uniformly distributed in and among the non-dissolvable polyvinyl alcohol fibers and held therein by the said matrix.

Similarly, the present invention provides an alkaline battery wherein the improvement is that battery having as the battery separator the laid mat described above.

The invention also provides a process wherein such a separator is prepared by mixing the non-dissolvable polyvinyl alcohol fibers, the dissolvable polyvinyl alcohol fibers, and the cellulosic fibers in a solvent liquid until the dissolvable fibers at least partially dissolve. A mat is formed from the fiber mixture and then dried to a shape-sustaining form.

Other important featrues of the invention will be described below.

DETAIL DESCRIPTION OF THE INVENTION

Figure 1:
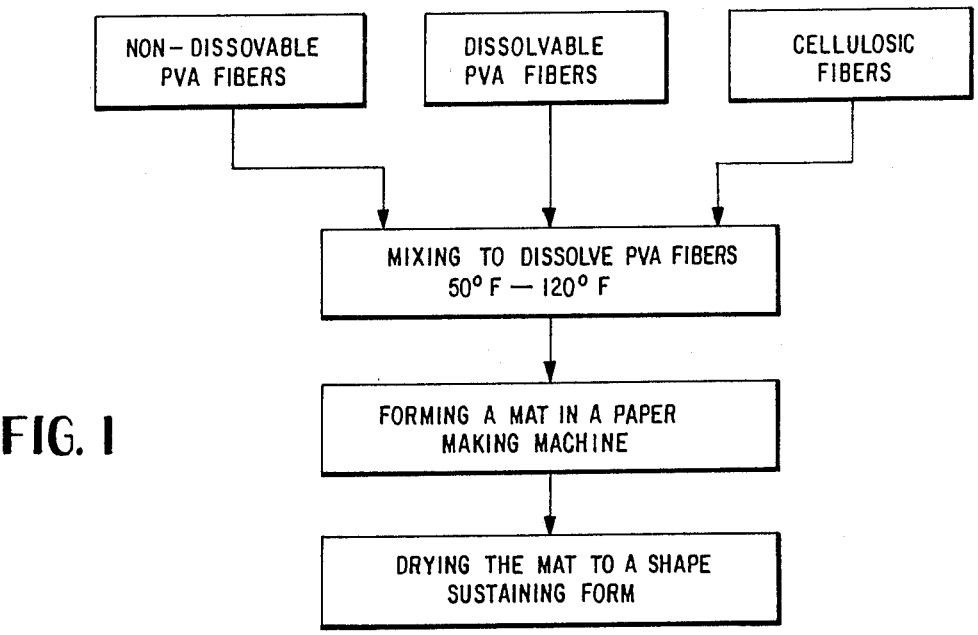
FIG. 1 is a block diagram of a preferred form of the process of the invention.

Considering first, the process of the invention, as noted above, a major feature of the present invention is that the present process can be carried out without any substantial complication of the conventional process for producing polyvinyl alcohol (hereinafter PVA) battery separators. Thus, as shown in FIG. 1, the basic steps of that process are mixing dissolvable PVA fibers and non-dissolvable PVA fibers and cellulosic fibers so as to dissolve or partially dissolve the dissolvable PVA fibers in the solvent (usually water). The dissolved PVA, in the solvent, permeates in and around the non-dissolvable PVA fibers and cellulosic fibers, and upon forming a mat of the non-dissolvable PVA fibers and cellulosic fibers, that solution of the PVA forms a matrix around the non-dissolvable PVA fibers and cellulosic fibers. That mat is then dried, and upon drying, the matrix of the dissolved PVA forms a shape-sustaining form of the mat.

Figure 2:
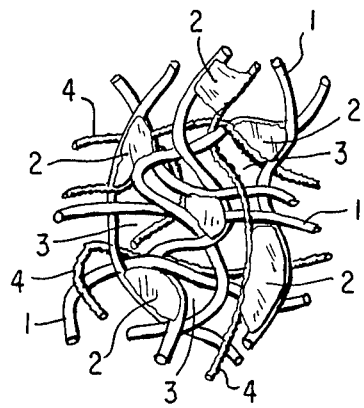
FIG. 2 is a highly idealized diagrammatic illustration of the arrangement of the non-dissolvable polyvinyl alcohol fibers, the cellulosic fibers, and the dissolved polyvinyl alcohol (forming a matrix for the mat).

In this latter regard, as highly diagrammatically illustrated in FIG. 2, the non-dissolvable PVA fibers 1 are intertwined among themselves, and the dissolved PVA fibers forms a matrix 2 with spaced apart permeable portions thereof, and with discrete pores 3. Thus, the non-dissolvable PVA fibers are held in a shape-sustaining form only by the permeable matrix 2. Since the dissolvable PVA fibers are, as manufactured, somewhat variable, during any one processing of the battery separator, more or less of those fibers may be dissolved. Further, some of the non-dissolvable fibers, due to manufacturing variabilities and processing conditions in forming the mat, may either dissolve or partially dissolve. FIG. 2, however, shows the case where none of the non-dissolvable fibers have partially dissolved and where all of the dissolvable PVA fibers have dissolved and the residues thereof form matrix 2. This is, of course, the ideal situation but one which does not always occur in normal manufacture. Thus, in other processing, a remainder of dissolvable, but undissolved PVA fibers may be present, and often are, as well as some partially dissolved non-dissolvable fibers. When lesser amounts of the PVA are in the matrix, the matrix is of greater permeability and greater pore size and less strength, or visa versa.

On the other hand, since matrix 2 results from the drying of the residue of dissolved PVA, the actual disposition of that matrix may be considerably varied. Accordingly, the permeability and pore size and distribution thereof in the separator will vary from place to place or even from processing to processing.

However, by placing in the separator cellulosic fibers 4, a totally non-dissolvable fiber is placed into the separator. While for clarity purposes, FIG. 2 only shows a small number of non-dissolvable fibers, cellulosic fibers, dispersed matrix and irregular pores, in actual practice, these fibers, matrix and pores would form a substantial opaque mat. It can therefore be appreciated that the presence of the totally non-dissolvable cellulosic fibers provides a far more predictable permeability of the separator, since all of the cellulosic fibers placed in the mixture from which the mat is formed will reside, precisely, in the formed mat. When higher amounts of the cellulosic fibers are placed in the separator, e.g., approaching about 85%, those amounts of cellulosic fibers will substantially affect the predictability of the strength and permeability of the separator.

The cellulosic fibers have a further advantage in that they are, by nature, relatively rough surfaced fiber, as shown in FIG. 2, as opposed to the surface texture of the PVA fibers. These relatively rough surfaced cellulosic fibers provide increased strength of the intertwined and intermatted PVA fibers and cellulosic fibers due to this rough surface texture. In other words, the cellulosic fibers have greater "binding" ability than the PVA fibers.

All of the foregoing was developed during the course of research leading to the present invention and the improvements sought by that research, as explained above, were realized. However, in testing of the improved battery separator in actual battery construction and use, a most unexpected and surprising discovery was made. Those tests showed that quite surprisingly, the dendritic formation in batteries constructed of the present improved battery separator was substantially suppressed. Further studies into the suppression of dendritic formation by the present improved battery separators have shown that such dendritic formation suppression is a result of the physical configuration of the present battery separator. This can be understood by a comparison of the conventional PVA battery separator, opposite the present improved battery separator containing the cellulosic fibers. As discussed above, the PVA fibers form unpredictable areas of matrix formation and unpredictable distribution of pores and pore sizes. Some portions of the battery separator, for example, may have larger pore sizes, while others have smaller pore sizes, but the average pore size is acceptable for ionic transfer. However, the existence of the larger pore sizes facilitates dendrite formation through those larger pores. Once dendrite formation pierces through the separator, and a short occurs, the battery will commence losing its energy. As more and more dendrite formations pierce the battery separator the battery will commence draining at a more rapid rate until the battery becomes weakened or even unserviceable.

As opposed to this, however, the cellulosic fibers may be very uniformly distributed in forming the PVA battery separator. These cellulosic fibers bridge through and around pores and in that manner effectively regulate the pore size formed in the PVA separator. Thus, while the PVA separator may have large pores formed by the matrix of the PVA, in those large pores, many cellulosic fibers will bridge and effectively create smaller pores than the pore created in the formation of the PVA matrix. The smaller the pore, of course, the more difficult for the dendrites to form in that pore and pierce the battery separator. Thus, the larger the amount of the cellulosic fibers, the more uniform and smaller is the pore size, and the greater the reduction in dendrite formation which can pierce the battery separator. As the amount of cellulosic fibers substantially increases in the battery separator, this effect becomes more pronounced and the formation of dendrites is correspondingly substantially decreased. Further, it was found that as even more cellulosic fiber is used in the PVA separator, the fibers form an indepth tortuous porosity. Dendrite formation is essentially perpendicular to the metal from which the dendrites form and the tortuous path through the indepth pores of the cellulosic fibers interferes with this perpendicular formation of the dendrites. Thus dendrite formation to the extent that the dendrites can pierce the separator is largely avoided with higher amounts of cellulosic fibers.

With this discovery, additional testing showed that the size of the cellulosic fibers also affected dendrite formation which could pierce the battery separator. As the fibers are smaller and smaller in size, the fibers form smaller pores and more tortuous pores indepth, which, as explained above, further suppresses dendrite formation and penetration of the battery separator. Thus, it was discovered that even further improved battery separators could be provided when the cellulosic fibers are of very small size. In this regard, the term size refers both to fiber diameter and fiber length, since it will be appreciated that both diameter and length affect the ability of the cellulosic fibers to evenly distribute in the PVA battery separator and to achieve the smaller effective pore size and the tortuous indepth pore size. As more fully explained below, such charactertistics of the cellulosic fiber are easily obtained.

Turning again to FIG. 1, the process of the present invention can be practiced with the usual equipment for producing PVA battery separators, i.e., conventional paper making machines, and no changes in the apparatus are required, with the one preferred exception discussed below. This is a substantial advantage of the present invention, in that the superior separator of the present invention can be produced without any substantial changes in the processing equipment. However, the process itself must be slightly altered.

Thus, instead of introducing only the dissolvable PVA fibers and the non-dissolvable PVA fibers into the mixing apparatus, in addition, the cellulosic fibers must also be introduced. It is necessary, as can be appreciated from the above, that the cellulosic fibers be relatively uniformly dispersed throughout the mixture. Otherwise, the intermingling of the fibers, in a uniform disposition, to provide increased uniformity of strength and pore size will not be provided. However, the cellulosic fibers are relatively strong fibers and can withstand considerable mixing without substantial deterioration. The nondissolvable PVA fibers, likewise, can stand considerable mixing, and for these reasons sufficient mixing can be and is accomplished to ensure a relatively uniform disposition of the cellulosic fibers in the mixture.

Once this mixture is formed, a mat is produced in the conventional manner on a conventional paper making machine, e.g., placing the mixture on a wire or screen to form a mat thereof. Likewise, the mat is dried to shape-sustaining form in a conventional manner, e.g., by dewatering and drying on cans, with or without vacuum. All of this is quite conventional in the art and need not be described herein in any further detail. However, generally speaking, the drying step should be carried out at a temperature which will not substantially degrade the PVA fibers. Conventional drying temperatures of about 50° to 270° F., more preferably about 80° to 150° F., are therefore preferred. This is especially true when the solvent used in the mixing step is water, which is the preferred solvent.

The cellulosic fibers are essentially imperious to the water solvent, e.g., will not substantially swell, degrade or the like during the mixing process. This is true even at higher water temperatures to facilitate the dissolution of the dissolvable PVA fibers. The dissolvable fibers dissolve at different rates and to different extends depending upon the temperature of the water and the degree of mixing. In the conventional processes, the temperature of the water solvent is usually from about 50° F. up to about 100° F., and such temperatures can be used and are preferred with the present process. However, the temperature of the mixing step can be as great as 150° F., but more preferably no greater than 120° F., e.g., between 50° and 120° F.

On the other hand, there must be sufficient mixing, at an appropriate temperature, such as the dissolvable fibers dissolve sufficiently that upon drying the dissolved PVA produces a shape-sustaining matrix for the remaining fibers, and the matrix is sufficient to allow cutting and shaping of the mat. Accordingly, the temperature of the water, the degree of mixing, the specific solubility of the dissolvable fibers, and the specific solubility of the non-dissolvable fibers must all be taken into account to assure this result, as well as the result of uniform dispersion of the cellulosic fibers in and among the non-dissolvable PVA fibers. Some experimentation, therefore, may be required in this regard, but that experimentation can be easily accomplished with only a limited number of test runs.

It will also be appreciated that there must be sufficient dissolvable fibers in the mixture to assure an adequate matrix of the residue of the dissolved PVA. While this will vary widely, depending upon the particular dissolvable fibers and non-dissolvable fibers, as well as the amount of cellulosic fibers used, generally speaking, the ratio of the non-dissolvable fibers to the dissolvable fibers is from about 9:1 to 1.5:1, but more preferably about 3.5:1.

As will also be appreciated, in order to achieve an uniform mixture of the non-dissolvable fibers and the cellulosic fibers, the fiber geometry of each is of importance. The non-dissolvable fiber should not have an average denier greater than about 10, or otherwise the fiber will be relatively stiff and difficult to uniformly disperse. On the other hand, the average denier should not be so small that the fiber could be damaged in the mixing. Therefore, the preferred average denier of the non-dissolvable fiber is from about 0.5 to 3 and more preferably from about 0.5 to 1.

Likewise, the average length of the fibers will affect the ability to uniformly disperse the fibers among themselves. Thus, it is preferred that the non-dissolvable fiber have an average length of no greater than about 12 mm. On the other hand, the fiber should be sufficiently long to achieve substantial intertwining of the fibers, and to this end the average fiber length should be at least about 3 mm. More preferably, the fiber will be about 3 to 5 mm.

While as noted above, up to about 85% of cellulosic fibers can be used in forming the separator, and at these higher amounts the improvements described above will be more pronounced, at this level of cellulosic fibers, the properties of the separator begin to change from that of a separator made of PVA fibers to a separator made of cellulosic fibers. The properties of a separator made of all cellulosic fibers are not sufficient for separator application, because the overall characteristics become unacceptable. Therefore, while up to 85% cellulosic fibers may be used, it is preferred that no more than about 60% or 50% be used. However good results are achieved when only 30% of cellulosic fibers are used. On the other hand, while only a few percent of cellulosic fibers will provide some improved properties, for substantial improved properties at least 5% of the cellulosic fibers should be used, and more preferably at least about 10%. Ideally, the amount of cellulosic fibers will be at least about 10% and up to 40%.

As noted above, the cellulosic fibers are relatively critical in terms of the specific characteristics thereof. While the fibers may be any natural cellulosic fibers or wood or plant pulp fibers, all of these fibers can vary considerably in terms of the specific compositions thereof, and especially in terms of compositions associated with the fibers. For example, if wood pulp fibers are used, those fibers must be removed from associated compositions, such as lignin, hemicellulose, and the like in order to provide the relatively pure cellulosic fibers. Otherwise, substantial amounts of these associated compositions can create substantial difficulties in the battery separators. Plant pulp fibers can have similar associated compositions, but in addition may have other compositions such as sugars and the like. Here again, when these fibers are used, the fibers should be separated from the associated compositions such that relatively pure pulp fibers are used.

A preferred from of the cellulosic fibers is that of cotton fibers, which are natural cellulosic fibers of relatively high purity. A pure form of cotton fibers is cotton linter fibers. While historically, cotton linter fibers were recovered from textile processing, as a relatively pure form of short, staple length cotton fibers, and such fibers are still available, that term is now used in the art to include cellulosic fibers of essentially the same purity as cotton linter fibers, but derived from other plant sources. For example, wood and plant pulp fibers may be treated so as to essentially remove the lignin, hemicellulose, sugars, and the like, and those recovered fibers may be treated so as to essentially remove the lignin, hemicellulosem sugars, and the like, and those recovered fibers are also referred to in the art as cotton linter fibers. Thus, the term "cotton linter fibers" is intended herein to mean not only the natural occurring cotton linter fibers but the manufactured forms thereof from other plant materials.

Cotton linter fibers are preferred, since, as noted above, the linters are relatively pure, short, staple length fibers, and these short, staple length fibers are able to provide the increased uniformity of pore size and the tortuous porosity described above. However, the same effect can be achieved by mechanically shortening other natural cellulose fibers. For example, natural cotton fibers can be mechanically shortened by a variety of textile treating machinery so as to produce from the relatively long natural cotton fibers very short staple lengths. Apparatus to achieve this effect is known as a refiner, and a double disk refiner is a typical example thereof. In a double disk refiner, a conical member having teeth, is rotated in an outer conical shell and the cotton is passed therebetween. Cotton fibers so processed will have average staple lengths considerably shorter than the natural cotton fiber and the average staple length actually achieved in such refiner is dependent upon the clearance between the conical sections, the design of the teeth and the like. With such apparatus, well known to the art, natural cotton fibers can be reduced in average fiber length to very short fiber lengths, even shorter than cotton linter fibers. Therefore, if natural cotton fibers are used, as opposed to cotton linter fibers, then it is greatly preferred that the natural cotton fibers be mechanically shortened in staple length, although natural cotton fibers without shortened staple lengths may be used in producing the battery separators, but in this case the improvements discussed above are somewhat lessened. There is no theoretical lower limit on the length of the cotton fibers, either mechanically shortened or cotton linter fibers, since the shorter the fibers the more pronounced are the improvements discussed above. However, from a practical and processing point of view, the cotton fibers, along with the PVA fibers, must be formed into a mat. Thus, the cotton fibers cannot be so short that they do not mat in conventional machines. If the fiber lengths are too short, the fibers will be removed from the mat during the usual mat formation and will not be retained in the mat. Thus, so long as the cotton fibers will be retained in the mat formation and not pulled through the forming screen, those lengths are acceptable for the present purposes. Indeed, the shorter the cotton fibers the better for purposes of the invention, so long as the fibers will be retained on the forming screen. On the other hand, since the longer the average staple length, the less pronounced the advantageous of the invention, it is also preferred that whatever the source of the cellulosic fibers, that the fibers have an average denier and staple length no greater than that of natural cotton fibers, and especially less than that of natural cotton fibers, e.g., less than one-half or one-fourth the staple length of natural cotton fibers. Thus, if manufactured cotton linter fibers or other cellulosic fibers are used, those fibers, as manufactured, or as reduced in length through a refiner or the like, should have an average staple length as described above.

Especially at the high levels of cotton fibers, i.e., up to about 85%, a change in the usual process is preferred. As can be appreciated, cotton fibers, or other cellulosic fibers of similar nature as discussed above, are subject to shrinking. This is particularly true in view of the processing required to form the PVA battery separator, especially the higher temperatures and in the wet condition. With greater amounts of the cellulosic fibers, the amount of shrinkage of the mat can be appreciable. While the shrinkage does not adversely affect the performance of the battery separator, it does complicate the manufacture thereof. In this regard, it is important to have predictable widths of the manufactured mat in order that those widths may be appropriately cut to sizes for battery separators without such cutting resulting in undue amounts of scrap (portions left over after cutting to appropriate sizes for battery separators). To substantially reduce such shrinkage, the cellulosic fibers, and especially natural cotton fibers, can be easily mercerized in a conventional mercerization process and such will substantially reduce the shrinkage of the resulting mat. The details of mercerization are well known to the art and need not be recited herein for sake of conciseness. The usual mercerization conditions are quite acceptable for purposes of the present process. Indeed, mercerized cotton and cotton linter fibers are available in the market.

In regard to the battery separator itself, in order to better function in an alkaline cell, the so produced mat preferably has a dry weight of about 0.6 to 1.4 lbs per 100 square feet, and especially about 1.2 lbs per 100 square feet. Thus, the process should be conducted so that the concentration of the fibers in the mixture, along with the rate of discharge thereof for matting and drying purposes, are such that mats of those weights will be produced. This, however, is the conventional method of producing such battery separators, and the particular concentration of fibers in the mixture can be according to the conventional concentrations, e.g., about 0.1% to 5%, more preferably about 0.4% to 1.0. Likewise, the conventional paper making apparatus used for producing the battery separators can be operated in the conventional manners for producing mats of these weights.

The use of cellulosic fibers provides yet a further advantage to the present invention. Especially with higher amounts of cellulosic fibers, the formed battery separator mat is susceptible to calendaring. By calendaring, the formed mat can not only be densified, which again serves to decrease the average pore size for the reasons explained above, but also provides the battery separator with a very predictable thickness. The predictability of the thickness of the battery separator is important in the manufacture of the alkali cell battery. For example, in a typical battery manufacture, the clearance between the two battery components, which is occupied by the separator, may be 13 mils. When the battery separator is placed in that space to separate the two battery components and wetted with alkali solutions, the battery separator will expand with the impregnation by the alkali solution. If the formed mat of the battery separator is not of predictable thicknesses, placing of the separator in the battery and the expansion thereof upon being wetted by the alkaline solution can cause the separator to either not snuggly fit in the space provided at all portions of the battery or be unduly compressed by those portions. With the present battery separator, the mat can be calendared to a predictable thickness, so that it can be readily manufactured in the battery (in the space provided) and therefore will predictably swell to the correct thickness. For example, the present separator material can be calendared on conventional heated can calendars with one or more nips at temperatures between 150° and 250° F., more usually between 180° and 200° F., with nip pressures from 100 to 500 pounds per linear inch, especially between about 300 and 400 pounds per linear inch. With such calendaring, for example, a mat formation of 13 mils can be densified and reduced in thickness to, for example, 4 mils or so, or 6 mils or 8 mils and allow for easy manufacture and predictable swelling when wetted with alkaline solution. While calendaring is not necessary for purposes of the invention, the densification during calendaring does provide improved advantages, as discussed above, and provides the special advantage of a very predictable manufacture of the battery. This is particularly true with use of higher amounts of cellulosic fibers, e.g., amounts of 30% or greater.

It will thus be seen that the invention provides a substantial improvement in the art in that the present battery separators have greater predictability of strengths, pore size, and permeability, less subject to unpredictable tearing in manufacture and fabrication into batteries, while at the same time providing the very important reduction in dendrite formation and even the very predictable thickness of the separator. The separators can be produced, essentially, in the usual process, with no substantial changes in the apparatus and very little change in the process, which is important to the invention.

The invention will now be illustrated by the following Example, but it is to be understood that the invention is not limited thereto, but extends to the scope of the foregoing specification and the following claims. In the Example, as well as in the specification and claims, all percentages and parts are by weight, unless otherwise indicated.

EXAMPLE

Into a conventional hydro pulper was placed 30 lbs. of cotton linters (HS225—98% pure alpha cellulose—Alpha Cellulose Corporation) and about 850 gals. of water at room temperature to provide about 0.4% concentration of the cotton linter in the water. The hydro pulp was operated for about 30 minutes to well disperse the cotton linters. This mixture was transferred to a conventional dump chest and to this mixture was added, with high agitation, 53 lbs. of non-dissolvable PVA fibers (Kuralon VPB 103, 1 denier,—average stable length of 3 mm-Kurraray Corporation), 17 lbs. of dissolvable PVA fibers (Kuralon VPB 105.2—1 denier—average staple length 4 mm—Kurraray Corporation) and about 2000 gals. of water at room temperature to provide about a 0.4% concentration of the total mixture. This mixture was pumped to a conventional mix box into which was metered a 5% solution in water of a wetting agent (Triton X 114). The rate of flow of the wetting agent was adjusted to achieve a wetting characteristic of the finished product as described below.

The mixture from the mix box was passed to a conventional wire screen paper making machine and the speed of the machine was adjusted to produce a dry weight of the subsequently formed mat of about 1.23 lbs./100 square ft. The de-watering step formed a wet mat of the fibers and the wet mat was dried on conventional cans heated to about 270° F. to a moisture content of less than 1%.

An industry standard wet-out test was performed. A 1 square inch sample of the dried mat was held edgewise over a cup of 35% KOH and dropped thereinto so that the sample floated on the KOH. The time required for the KOH to wet through the sample was noted. The sample should wet through in less than 5 seconds but more than instantaneously. The flow rate of the wetting agent, discussed above, was adjusted until the wet-out time was approximately 3 seconds. The wet-out time was periodically measured during the course of each run and the flow rate of the wetting agent was adjusted accordingly.

The recovered dried mat had a weight of about 1.2 lbs/100 square foot, a thickness of about 13 to 14 mils, a machine direction tensile strength of about 40 lbs./inch, a cross-direction tensile strength of about 25 lbs./inch, a burst strength of between 15 and 30 lbs./inch$^2$, a wet-out time in 35% KOH of about 3 seconds, and a permeability (air) of about 40 ft.$^3$/min./ft.$^2$. The product had no dimensional change in 35% KOH.

Part of the product was calendared with a nip pressure of 350 pounds per linear inch to reduce the thickness to about 4.25 mils. The properties, described above, essentially remained, but this reduced thickness mat is most useful in high efficiency/low volume alkaline dry cell batteries.

What is claimed is:

1. In an alkaline dry cell battery separator being a laid mat of non-dissolvable polyvinyl alcohol fibers held together by a matrix of dissolved or partially dissolved dissolvable polyvinyl alcohol fibers, the improvement comprising the mat having up to 85% of cellulosic fibers relatively uniformly distributed in and among the non-dissolvable polyvinyl alcohol fibers and held therein by said matrix.

2. The separator of claim 1, wherein the ratio of non-dissolvable polyvinyl alcohol fibers to dissolvable polyvinyl alcohol fibers is from 9:1 to 1.5:1.

3. The separator of claim 2, wherein the said ratio is about 3.5:1.

4. The separator of claim 1, wherein the non-dissolvable fibers have an average denier of about 0.5 to 3.

5. The separator of claim 4, wherein the said denier is from about 0.5 to 1.

6. The separator of claim 1, wherein the non-dissolvable fibers have an average length of at least about 3 mm.

7. The separator of claim 6, wherein the said length is about 3 mm to 5 mm.

8. The separator of claim 1, wherein the said mat has up to about 80% of cellulosic fibers therein.

9. The separator of claim 8, wherein the said mat has at least 5% of cellulosic fibers therein.

10. The separator of claim 9, wherein the said mat has at least 10% and up to 40% of cellulosic fibers therein.

11. The separator of claim 1, wherein the cellulosic fibers have an average denier and staple length no greater than that of natural cotton fibers.

12. The separator of claim 11, wherein the said denier and length are less than that of natural cotton fibers.

13. The separator of claim 1, wherein the cellulosic fibers have been mechanically reduced in staple length to have a staple length less than one-half of the staple length of natural cotton fibers.

14. The separator of claim 13, wherein the said mechanically reduced length is less than one-fourth the staple length of natural cotton fibers.

15. The separator of claim 1, wherein the cellulosic fibers are natural cellulosic fibers or wood or plant pulp fibers.

16. The separator of claim 15, wherein the cellulosic fibers are cotton linter fibers.

17. The separator of claim 1, wherein the mat has a dry weight of about 0.6 to 1.4 lbs. per 100 square feet.

18. The separator of claim 17, wherein the said weight is about 1.2 lbs. per 100 square feet.

19. An alkaline cell battery having therein the battery separator of claim 1.

* * * * *